United States Patent [19]

Wagner et al.

[11] 3,836,423

[45] Sept. 17, 1974

[54] METHOD OF INTRODUCING AIR PERMEABILITY INTO A NON-POROUS CONTINUOUS FILM AND RESULTANT FILM

[75] Inventors: George M. Wagner, Lewiston; Norman E. Sitgreaves, Niagara Falls, both of N.Y.

[73] Assignee: Hooker Chemical Corporation, Niagara Falls, N.Y.

[22] Filed: Sept. 9, 1971

[21] Appl. No.: 178,985

[52] U.S. Cl............. 161/159, 117/138.8 D, 161 KP/, 161/190, 161/DIG. 2, 260/2.5 AY, 264/47, 264/53, 264/DIG. 5, 264/DIG. 13
[51] Int. Cl........ B29d 27/04, B32b 3/26, B32b 5/04
[58] Field of Search............ 117/161 KP, DIG. 7, 60, 117/138.8 D; 156/77, 78, 246; 161/DIG. 2, 190, 159; 260/2.5 BC, 2.5 BD, 2.5 AY; 264/47, 52, 51, 54

[56] References Cited
UNITED STATES PATENTS

| | | | |
|---|---|---|---|
| 3,144,492 | 8/1964 | Lightner et al. | 264/53 X |
| 3,154,605 | 10/1964 | Meyer et al. | 264/53 |
| 3,180,910 | 4/1965 | Buhmann | 264/47 X |
| 3,296,016 | 1/1967 | Murphy | 260/2.5 AY |
| 3,399,106 | 8/1968 | Palmer | 264/47 X |
| 3,428,471 | 2/1969 | Tuthill | 264/47 X |
| 3,458,337 | 7/1969 | Rigg | 264/47 UX |
| 3,514,313 | 5/1970 | Martel et al. | 117/60 |
| 3,625,871 | 12/1971 | Traubel et al. | 264/41 X |
| 3,646,178 | 2/1972 | Traubel et al. | 264/41 |
| 3,650,880 | 3/1972 | Tieniber | 156/239 X |
| 3,663,472 | 5/1972 | Raymond | 260/2.5 AY |

FOREIGN PATENTS OR APPLICATIONS

| | | | |
|---|---|---|---|
| 1,188,573 | 4/1970 | Great Britain | 264/54 |

*Primary Examiner*—Philip E. Anderson
*Attorney, Agent, or Firm*—Peter F. Casella; James F. Mudd; Andrew E. Pierce

[57] ABSTRACT

A porous air permeable polymer film is produced by applying to a support member an agent capable of releasing gas upon its being heated to its decomposition point and subsequently applying a first film-forming flexible polymer composition: forming a porous continuous film on said support member by heating said first layer; cooling said film and support member; applying to said porous film a layer of a second film-forming polymer composition which may be the same or different than the first film forming polymer composition; and heating the resulting structure to form a unitary porous breathable article comprised of both polymer layers. Subsequent to the application of said second film-forming polymer composition a fabric may be applied to the resulting structure to form a unitary porous air permeable article.

9 Claims, 2 Drawing Figures

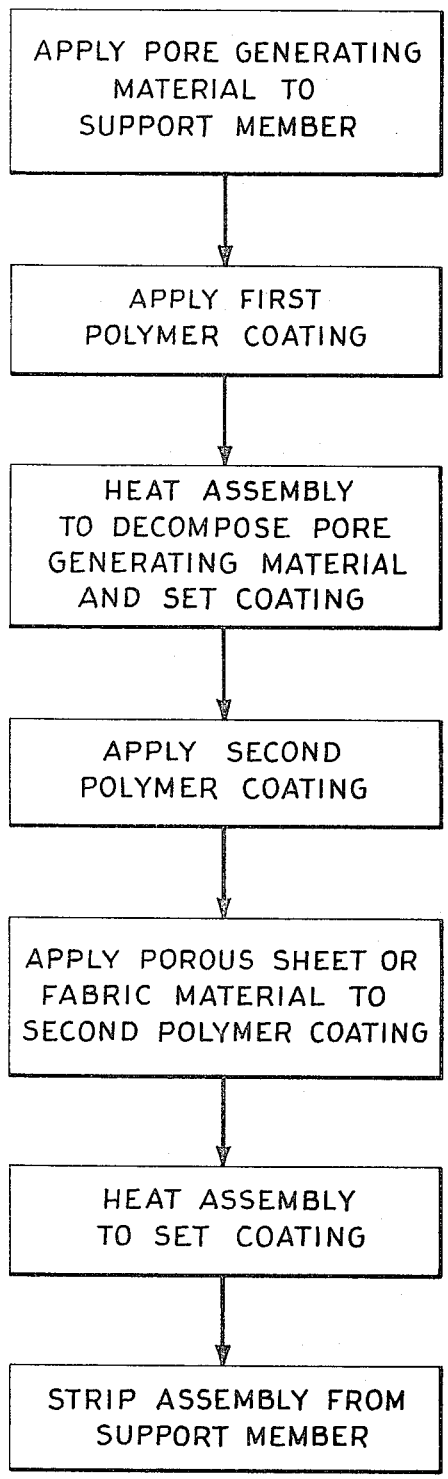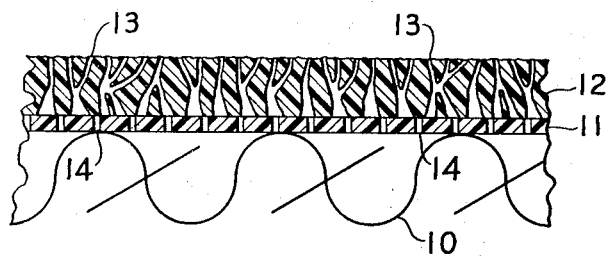
Fig. 2
Fig. 1

METHOD OF INTRODUCING AIR PERMEABILITY INTO A NON-POROUS CONTINUOUS FILM AND RESULTANT FILM

BACKGROUND OF THE INVENTION

1. Field of the Invention

This invention relates to the production of polymer systems having porous or poromeric water repellent structures exhibiting permeability to moisture or water vapor which is commonly referred to as "breathability" and also allowing the passage of water under pressure through the numerous pores. The breathability of these porous polymer systems permits their use as coating for fabrics or in films which are intended for use in contact with a portion of the human body permitting contact without the usual discomfort associated with water resistant and water repellent fabric coatings or films which are impermeable to moisture or water vapor. Thus the invention relates to the production of leather substitutes having the aesthetic appeal of leather which are easy and economical to fabricate, dry cleanable, abrasion resistant and resistant to removal by water and common household solvents.

2. Description of the Prior Art

Various methods have been developed for producing plastic coatings. A mechanical perforation of the plastic film which alters the appearance of the film often rendering it visibly porous or with an oriented linear pattern has many disadvantages most important of which is the inferior aesthetic appeal and the use of extensive equipment which may interfer with the smoothness and gauge control of the composite sheet material. Another method of introducing porosity is by the use of chemical blowing agents admixed with polyvinyl chloride copolymers to be applied as a coating. Upon removal of the organic solvent carrier for the plastic composition and the blowing agent, heat is applied to decompose the blowing agent and introduce gas into the plastic coated material to produce a spongy or foamy solidified plastic coating having large openings on one side of the film and few if any openings on the opposite side. Because of this unevenness of pore formation, it has been found that the use of a blowing agent as described is useful in producing foamed layers which can serve only as intermediate layers or as base layers against a fabric or other substrate upon which the plastic is coated. That is, for aesthetic appeal it is necessary to additionally coat the foamed plastic coating with another plastic coating not containing a blowing agent and thus the composite structure is deficient in not containing pores throughout.

A prior art method of overcoming the difficult task of forming pores in polyurethane polymer systems while at the same time retaining the unique physical and chemical properties for which polyurethanes are known is to disperse within the polyurethane film a solid pore forming material such as a salt and subsequently treating the resulting film with a liquid which is capable of dissolving the pore forming materials leaving a microporous polyurethane system.

In Ser. No. 777,428 filed Nov. 26, 1968 and now U.S. Pat. No. 3,650,880 and Ser. No. 25,122 filed Apr. 2, 1970 and now abandoned a basic process of introducing breathability into a polymer film is shown. The pores in the polymer coating are formed merely by the controlled application of heat to the separate and subsequently combined layers of polymer.

It is a principle object of the present invention to provide a porous polymer coating process improvement of Ser. No. 777,428 and now U.S. Pat. No. 3,650,880 and Ser. No. 25,122 and now abandoned wherein more positive control of the degree of porosity can be obtained without detracting from the appearance of the surface of the polymer film and thus retaining the aesthetic appeal of a non-porous polymer surface.

SUMMARY OF THE INVENTION

This invention relates to a method of introducing porosity and/or breathability into a non-porous continuous polymer film, to the porous breathable continuous polymer films thus produced, and to polymer coated fabrics produced by applying fabric to the polymer films. In the process of the invention, a coating of a polymeric material is produced by first applying a pore generating material to a support member. Subsequently, a coating of polymer is applied to the support member and the resulting assembly heated to set the coating or evaporate the carrier solvent from the polymer material. A second layer of polymer material can be optionally applied over the first layer and the polymer surface can be optionally covered with a sheet material such as a porous paper or fabric and the assembly heated to set the coating or evaporate the carrier solvent and effect a cure. During the heating stage, the material is heated sufficiently so that the pore generating material reaches a stage wherein it decomposes to provide the release of gas which provides the pores within the polymer coated composition. Thus a stable composite structure is produced made up of a porous polymer coating adhered to a substrate which can be fabric.

DESCRIPTION OF THE DRAWING

The practice of this invention is schematically illustrated in the accompanying drawing wherein:

FIG. 1 is a flow sheet illustrating various steps in accordance with the practice of this invention for the production of a porous structure characterized by a porous polymer coating adhered to a sheet or fabric substrate and wherein;

FIG. 2 schematically illustrates in cross section a porous structure in accordance with a preferred embodiment of this invention wherein a porous polymer coating is adhered to a porous sheet or fabric substrate. In FIG. 2, there is shown a partial cross-section of a porous permeable substrate 10. Polymer layers 11 and 12 comprise respectively a tiecoat which functions as an adhesive to bond the porous sheet material or fabric material and a skin coat or face coat of the assembly. The multitude of porous channels 13 extend throughout the thickness of the polymer coating. The polymer layer 11 is discontinuous having voids 14 which allow the layer to be porous. As is shown by FIG. 2, the fabric material is porous, the polymer coatings 11 and 12 are porous, and the resulting composite structure is permeable to air.

DESCRIPTION OF THE PREFERRED EMBODIMENTS

The method of the invention contemplates applying to a support member a composition adapted to emit fine streams of gas under certain conditions of temperature. The composition which can be a chemical blowing agent as hereinafter described can be applied to the support member by various methods. The support member if composed of paper can be saturated with the blowing agent or the surface upon which the polymeric coating is to be applied can be coated continuously with a thin film of blowing agent. Alternately, the blowing agent can be applied discontinuously to the surface of the support member in a micro dot pattern film forming. Subsequently, a liquid polymeric material such as a polyurethane plastic composition in organic solvent is then coated upon the surface of the support member and the polymer composition together with the gas forming preparation is passed to a chamber heated to an elevated temperature, wherein the assembly is subjected to heating for a period of time sufficient to release very fine gas streams from the pore generating preparation previously applied to the support member. During the heating and partial curing of the polymeric coating layer, these gas streams form very fine pores in the polymeric material. These pores remain during and after final curing of the polymeric material. Subsequent to the application of the first coating to the support member and the evaporation of organic solvent and partial cure thereof as described above, a second coating of polymeric material can be applied over the first coating and where a sheet or fabric material is to be incorporated therewith this is applied prior to the heating and drying of the second coating. Thus a coated fabric or coated substrate can be produced readily in which the skin or surface layer of the coating on the sheet or fabric material can be appropriately modified by its contact with the support member which may be smooth or have an irregular surface such as an embossed surface so as to introduce a pattern on the surface of the coating.

The polyurethanes are produced by reacting an organic polyisocyanate, generally a diisocyanate, with a selected polyol, usually a diol. Generally a polyether polyol or a polyester polyol is employed having a hydroxyl number in the range of about 30 to 200, preferably about 40 to 170. Generally, the polyethers are based on adducts of dihydric alcohols, such as ethylene glycol, reacted with ethylene oxide or other alkylene oxides to provide terminal hydroxyl groups. The polyesters employed are reaction products of a polycarboxylic compound, preferably a dicarboxylic compound, including acids, anhydrides and acid halides, such as adipic, succinic, glutaric and the like, with an alcohol, preferably a dihydric alcohol such as ethylene glycol, diethylene glycol, 1,4-butanediol 1,6-hexanediol, and the like. A free unreacted glycol of similar type can be admixed with the polyester to vary the properties of the polyurethanes, if desired, up to about 2 moles of glycol per mole of polyester. Other hydroxyl containing polymers, such as polymerized lactones such as polycaprolactones, can be employed. The flexible polyurethane employed is preferably elastomeric. Various diisocyanates can be employed in preparing the polyurethanes. Useful diisocyanates include dephenylmethane diisocyanate, hydrogenated dephenylmethane diisocyanate, toluene diisocyanate, n-hexyl diisocyanate, naphthalene diisocyanate and the like.

The polyurethane compositions can be produced by reacting a particular polyol with a particular organic polyisocyanate or by reacting a mixture of various polyols with one or more organic polyisocyanates. Increasing the crystallinity or cross-linking density can be accomplished by methods known in the art. For example, the cross-linking density can be increased by employing a cross-linking agent such as an organic triisocyanate. Typical triisocyanates include 2,4,6-toluene triisocyanate, 4,4',4''- triphenyl methyltriisocyanate, polyarylpolyisocyanates such as polymethylene polyphenylisocyanate, polyisocyanates which are reaction products of trihydric alcohols and diisocyanates, such as the adducts of trimethylol propane and toluene diisocyanate, hexamethylene diisocyanate, or methylene bis(cyclohexylisocyanate), and the like.

The polymer compositions can be polyurethanes of the foregoing type although the polyurethane need not be identical in both coatings, or a vinyl polymer or copolymer, a polymer of the acrylic family, i.e., polymers of acrylic acid and is derivatives, polyamides, polyesters or the like. Representative vinyl polymers and copolymers include poly(vinyl chloride); poly(vinylidine chloride); poly(vinyl acetate); poly(vinyl acetals) such as poly(vinyl butyral), poly(vinyl formalethyl) and the like; poly(vinyl ketals) such as those derived from cyclohexanone; poly(vinyl ethers) such as poly(vinyl methylether), poly(vinyl isobutyl ether), poly(vinyl stearyl ether), and the like; poly(vinyl aldehydes and ketones) such as poly(methylvinyl ketone), poly(isopropenyl methyl ketone), acrolein (acrylic aldehyde), and the like; nitrogen-containing vinyl polymers such as poly(N-vinyl carbizole), poly(N-vinyl pyrrolidone, poly(N-vinyl pyridine), and the like vinyl polymers. Copolymers of the foregoing vinyl polymers can also be employed.

The polymers of the acrylate family include polyacrylic acid and its esters, alpha-haloacrylic acid and its esters, acrylonitrile, acrylyl halides, amides, anhydrides, and anilides. Typical compounds include polyacrylic acid, polymethacrylic acid, poly(methyl acrylate), poly(ethyl acrylate), poly(butyl acrylate), poly(n-hexyl acrylate), poly(1,1-dihydroperfluorobutyl acrylate), poly(benzyl acrylate), poly(cyclohexyl acrylate), poly(phenylethyl acrylate), poly(chloroacrylate), poly(fluoroacrylate), poly(methyl methacrylate), poly(ethyl methacrylate), poly(butyl methacrylate), poly(cyclohexyl methacrylate), poly(lauryl methacrylate), poly(ethylene methacrylate), poly(n-amyl methacrylate), poly(ethylenediglycol diacrylate), polyacrylamide, polymethacrylamide, polymethylmethacrylamide, polyethylmethacrylamide, and the like.

The polyamides which are useful in the process of this invention are prepared by condensing dicarboxylic acids or acid halides, such as those disclosed hereinbefore, with a diamine such as hexamethylenediamine or by the polymerization of amino acids to form, in either case, long polyamide chains. Typical polyamides include the product of hexamethylene diamine and adipic acid, polycaprolactam, the product of hexamethylenediamine and sebacic acid, poly(11-aminoundecanoic acid), poly(12-amino-docecanoic acid) and the like. The polyesters are reaction products of a polycarboxylic compound and an alcohol which has been described hereinbefore.

The polyurethane and polymer compositions are employed as a solution or dispersion in an inert liquid or carrier.

The solutions or dispersions can also contain catalysts, such as tertiary amines, surface active agents such as silicones, and other additives, such as talc, carbon black, dyes, colorants, fillers and flames retardants. The liquid carrier is generally a combination of an alkylamide, an aromatic hydrocarbon or an aliphatic ketone. Suitable alkylamides have the formula

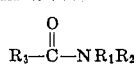

wherein $R_1$ and $R_2$ are alkyl, and $R_3$ is selected from the group consisting of hydrogen and alkyl. The alkyl groups generally have 1 to about 6 carbon atoms. Typical amides that can be used in the practice of the invention include: dimethylformamide, diethylformamide, dipropylformamide, methylhexylformamide, dimethylacetamide, diethylacetamide, methylhexylacetamide, and the like. Mixtures of any of the foregoing amides can also be employed. Suitable aromatic hydrocarbons include benzene, toluene, xylene, ethylbenzene, and the like. Suitable aliphatic ketones have 3 to 9 carbon atoms and include acetone, methyl ethyl ketone, diethyl ketone, methyl propyl ketone, dibutyl ketone, and the like. Other less preferred carriers include dimethylsulfoxide, tetrahydrofuran and cyclohexanone. The carrier for the polyurethane can also be a nonsolvent such as butyl lactate, water, alcohols such as methanol and ethanol, and the like. Mixtures of any of the foregoing carriers can also be employed. Concentration can vary depending on the choice of carriers, but will generally be in the range of about 10 to 60 weight percent solids, preferably about 15 to 40 weight percent solids based on the weight of the solution.

The invention is not limited to any particular kind of fabric material and, in general, porous material such as knitted goods, woven textiles or non-woven textiles, can be used. The fabric can be made of natural or synthetic fibers, such as cellulosic fibers, jute, cotton, wool, nylon, polyester, rayon, acetates, polyurethanes, acrylics and polyolefins. Moreover, other cellulosic materials can be used as the fabric material, such as paper, cardboard, and the like. Also useful are foamed materials such as expanded vinyl, foamed polyurethane and foamed rubber sheets. "Open-celled" foams are preferred.

In the process of the invention, the evaporation rate of the carrier of the polymer composition need not be controlled to aid in giving the desired size and density of pores in the unitary article, but is instead chosen so that the diluent may be simultaneously removed from the film while pore formation is taking place. The evaporation rate is a function of the drying temperature and temperature gradient, the choice of carriers used, concentration, film thickness, and removal of evaporated carrier from the environment of the drying film. Removal of the carrier vapors is facilitated by passing air or other inert gas through the drying means, so that air velocity and air quality also affect evaporation rate. The configuration of the heating zones also affects the evaporation of the volatile components. Residence time in the heating zones is dependent on the temperature of the heating zones, the polyurethane film thickness and the carriers employed, but is generally in the range of about 0.5 to 20 minutes, preferably about 1 to 10 minutes.

The polymer films and polymer coated fabrics of the invention are breathable in that they are readily permeable to air and other gases, and to the vapors of water and other liquids. The film and coated fabrics are however substantially repellant to liquid phase water and other liquids due to the character of the polymer surface. The total thickness of the coating layers and the thickness of each individual layer can be varied considerably. Generally, the total coating thickness is in the range of about 1 to 30 mils, preferably about 2 to 10 mils. Each of the coating layers is continuous in the sense that they are continuously applied along the length of the web or support member as opposed to intermittent application.

The invention comprises use of a pore generating material which is to be applied to the support member and which has a decomposition point within the temperature range used for evaporating the organic solvent from the polymeric layer. It is possible to effectively change the rate of gas escape by combining two or more pore forming materials which release gas over different temperature range conditions. The evaporation rate of the organic solvent carrier for the polymeric material can be changed by the use of alternate organic solvents so that the rate of emission and density of emission of gas streams as well as the diameter of emitted gas bubbles can be controlled relative to the rate of evaporation of the organic solvent from the polymeric layer material. Thus controlling the rate of gas formation within the polymeric layer provides a control over the density of the pores in the finished product. Since the polymeric film increases in strength during the setting by heat or the evaporation of solvent, it is important to select the pore forming material or to use combinations of two or more pore forming materials such that the gas streams which escape into the polymeric material do so while the polymer is still fluid thus avoiding the creation of blisters in the polymeric material layer. Suitable pore forming materials are organic azo compounds, nitroso compounds, and hydrazide compounds. Typical pore forming materials together with the average temperature at which these compositions decompose and release gas are as follows:

| | |
|---|---|
| N,N'-dimethyl-N,N'-dinitroso terephthalamide | 200°F |
| Benzene 1,3-sulphohydrazide | 310°F |
| Azodicarbonamide | 350°F |
| 4,4'-oxybis(benzene sulfonyl hydrazide) | 370°F |

The amount of pore forming material used is, of course, dependent upon the end properties desired in the porous polymer system. For most purposes, from about 1 to about 5 parts by weight of pore forming material per 100 parts by weight of the polymer composition can be used with from about 0.2 to about 1.0 part preferred. The pore forming material is used in such minor amounts that it has not been found to adversely affect the physical properties of the polymer composition. The appearance of a thin film of the resultant porous polymer structure, for instance, a polyurethane system under magnification of from 5 to 10 power is that of interconnecting passages.

The final product is a polymer coated substrate or polymeric film wherein the polymer surface may be smooth and exhibit high gloss or alternately may be embossed with a surface pattern taken from the pattern of the support member and in which the surface is apparently unperforated when viewed with light behind the viewer while when the product is viewed with the product placed between the light source and the viewer, the material is found to include a multiplicity of pores. The water vapor permeability of the composite material renders the structure useful where a high degree of porosity is required such as in substitute for leather.

The following examples are illustrative of the ease with which porous polyurethane coating films and fabric materials may be prepared in accordance with the invention. All percentages herein are expressed by weight and all temperatures in degrees centigrade unless otherwise indicated.

EXAMPLE 1

A release coated paper made by the S. T. Warren Paper Company under the trade designation "S/K Vel Cis Bison" was coated with 3 percent based upon the weight of the successively applied polymer film of a pore forming material sold under the tradename "Kempore 125" by the National Polychemicals. This is 33 percent active material in paste form with dioctyl phthalate as the vehicle. This material is an azodicarbonamide and has been found to decompose to release gas at an average temperature of 350°F. After the pore forming material had been applied on the coated release paper, a coating solution was prepared as follows:

A polyurethane solution comprising 34.9 parts of a solution comprised of about 155 parts of a thermoplastic polyurethane of a linear, hydroxyl-terminated butane diol-adipate polyester of 700 molecular weight, butanediol, isopropanol and hydrogenated diphenylmethane diisocyanate in solution in a mixture of 139 parts of dimethylformamide and 139 parts of xylol; 24.1 parts of a solution comprised of about 154 parts of a polyurethane of a linear, hydroxyl-terminated butane diol-adipate polyester of 700 molecular weight, butanediol, hexanetriol and hydrogenated diphenylmethane diisocyanate in solution in a mixture of 139 parts of dimethyl formamide and 139 parts of xylol; 3.2 parts of the adduct of trimethylol propane and methylene bis(cyclohexylisocyanate); 13.4 parts of a color concentrate; 1.7 parts of cellulose acetate butyrate; 11.3 parts of dimethyl formamide and 11.3 parts of toluene. The solution was coated on an embossed release paper with a reverse roll coater.

The film was dried at 140°F. for 3 minutes and subsequently cured at 400°F. for 2 minutes. A second polyurethane coating solution was prepared and applied of components as follows: The second polyurethane coating solution was prepared of components comprising 83 parts of a solution comprised of about 140 parts of a thermoplastic polyurethane of a linear, hydroxyl-terminated ethylene glycol-adipate polyester of 2,000 molecular weight, butanediol, isopropanol and diphenylmethane diisocyanate in a solution of a mixture of 150 parts of dimethylformamide and 100 parts of toluene; 2 parts of dimethyl formamide; 3 parts of toluene; and 6 parts of butyl lactate; and 6 parts of a color concentrate. A cotton drill fabric was continuously laid on the second coating and the coated assembly was cured at 400°F. for 3 minutes. The fabric was separated from the release coated paper and the porosity was measured by the Gurley Densometer by test method CCT 191B-5452. The porosity was found to measure between 33 and 68 seconds per 100 milliliters of air. This porosity compares favorably with a similar polyurethane coating prepared without the use of a pore generating material which gave a Gurley porosity reading of 100 seconds per 100 milliliters of air. The material obtained was suitable for use as upholstery material in furniture to provide comparable comfort as compared to natural leather.

EXAMPLES 2, 3 AND 4

The process of Example 1 was repeated using successively in place of "Kempore 125" as the pore forming material, N,N'-dimethyl-N,N'-dinitroso terephthalamide as a paste with 10 percent solids in dimethyl formamide as the vehicle, benzene sulphohydrazide, 5 percent solids in dimethyl formamide, and 4,4'-oxybis-(benzene sulfonyl hydroxide), 10 percent solids in dioctyl phthalate. The materials obtained were porous.

Various changes and modifications may be made in the method and apparatus of the invention, certain preferred forms of which have been herein described, without departing from the spirit and scope of the present invention.

What is claimed is:

1. A method for producing an air permeable porous film comprising:
   1 applying to a release coated support member a solid chemical blowing agent capable of producing a gas on heating to its decomposition temperature,
   2 applying a first solution or dispersion layer of a liquid film forming thermosetting polyurethane resin to said support member,
   3 heating said first layer together with said blowing agent capable of producing a gas on heating to a temperature in the range of its decomposition temperature to prepare bubbles of gas and to cause migration throughout said first layer by said gas bubbles and to evaporate the solvent of the solution or dispersion and to cure said resin whereby a solidified porous resin layer is formed; and
   4 stripping the layer from the support member.

2. A method in accordance with claim 1 wherein said blowing agent capable of producing a gas on heating to its decomposition temperature is selected from the group consisting of azodicarbonamide, N,N'-dimethyl-N,N'-dinitroso terephthalamide, benzene sulphohydrazide, and 4,4'-oxybis(benzene sulfonyl hydroxide).

3. An air permeable porous film produced by the process of claim 1.

4. A method for producing a coated sheet material in accordance with claim 1 wherein additional steps in the process prior to the stripping step comprise:
   4 applying to the first layer a second solution or dispersion layer of a liquid film forming thermosetting polyurethane resin, which may be comprised of the same or different urethane reactants than said first coating to form a permanent bond therewith,
   5 laying a porous sheet material on said second layer to interlock the porous sheet material therewith, and
   6 further heating to evaporate the solvent and cure the second layer and form a composite unitary air permeable article.

5. An air permeable article produced by the method of claim 4.

6. A method for producing an air permeable porous film comprising:
   1 applying to a release coated support member a solid chemical blowing agent capable of producing a gas on heating to its decomposition temperature;

2 applying a first solution or dispersion layer of a liquid film forming thermoplastic polyurethane resin to said support member, 3 heating said first layer together with said blowing agent capable of producing a gas on heating to a temperature in the range of its decomposition temperature to prepare bubbles of gas and to cause migration throughout said layer by said gas bubbles and to evaporate the solvent of the solution or dispersion whereby a solidified porous resin layer is formed and;

4 stripping the layer from the support member.

7. A method for producing a coated sheet material comprising:

1 applying to a release coated support member a solid chemical blowing agent capable of producing a gas on heating to its decomposition temperature, 2 appplying a first solution or dispersion layer of a liquid film forming polymeric material selected from the group consisting of thermoplastic polyurethanes polymers of the acrylic family, and polyamides to said support member, 3 heating said first coating together with said blowing agent capable of producing a gas on heating to a temperature in the range of its decomposition temperature to prepare bubbles of gas and to cause migration throughout said first coating by said bubbles and to evaporate the solvent of the solution or dispersion to form a solidified porous polymeric layer, 4 applying a second solution or dispersion layer of a liquid film forming polymer selected from the group consisting of thermoplastic polyurethanes polymers of the acrylic family, and polyamides which may be comprised of the same or different polymer member from said group than said first layer to form a permanent bond therewith, 5 laying a porous sheet material on said second coating to interlock the porous sheet material therewith, and 6 heating to evaporate the solvent of the solution or dispersion to form a composite unitary air permeable article;

7 stripping the composite article from the support member.

8. An air permeable article produced by the method of claim 7.

9. A method in accordance with claim 7 wherein said chemical compound capable of producing a gas on heating to its decomposition temperature is selected from the group consisting of azodicarbonamide, N,N'-dimethyl-N,N'-dinitroso terephthalamide, benzene sulphohydrazide, and 4,4'-oxybis(benzene sulfonyl hydroxide).

* * * * *